(12) United States Patent
Kitaura et al.

(10) Patent No.: US 6,660,356 B1
(45) Date of Patent: Dec. 9, 2003

(54) OPTICAL INFORMATION RECORDING MEDIUM, METHOD FOR PRODUCING THE SAME, AND METHOD AND APPARATUS FOR RECORDING/REPRODUCING INFORMATION THEREON

(75) Inventors: Hideki Kitaura, Kyoto (JP); Noboru Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/569,316

(22) Filed: May 11, 2000

(30) Foreign Application Priority Data

May 12, 1999 (JP) ............................................. 11-130900

(51) Int. Cl.⁷ ............................... B32B 3/02; G11B 7/24
(52) U.S. Cl. .................... 428/64.4; 428/64.2; 428/64.6; 369/275.1
(58) Field of Search ............................... 428/64.4, 64.6, 428/64.2; 369/275.1

(56) References Cited

U.S. PATENT DOCUMENTS

| | | |
|---|---|---|
| 5,273,861 A | 12/1993 | Yamada et al. |
| 5,431,978 A | 7/1995 | Nakamura et al. |
| 5,688,574 A | 11/1997 | Tamura et al. |
| 5,726,969 A | 3/1998 | Moriya et al. |
| 5,761,188 A | 6/1998 | Rosen et al. |
| 5,764,619 A | 6/1998 | Nishiuchi et al. |
| 5,883,877 A * | 3/1999 | Nishizawa .............. 369/275.1 |

FOREIGN PATENT DOCUMENTS

| | | |
|---|---|---|
| EP | 0 720 159 | 7/1996 |
| EP | 0 860 295 | 8/1998 |
| EP | 0 957 477 | 11/1999 |
| JP | 1 149238 | 6/1989 |
| JP | 7 78354 | 3/1995 |
| JP | 7 105574 | 4/1995 |
| JP | 7 262607 | 10/1995 |
| JP | 9 212917 | 8/1997 |
| JP | 10 505188 | 5/1998 |

* cited by examiner

Primary Examiner—Cynthia H. Kelly
Assistant Examiner—L. Ferguson
(74) Attorney, Agent, or Firm—Merchant & Gould P.C.

(57) ABSTRACT

An optical information recording medium includes a first information layer, a separating layer, a second information layer and a protective substrate in this order on a transparent substrate. The second information layer comprises an optical interference layer, a lower protective layer, a recording layer, an upper protective layer, and a reflective layer in this order from the side near the transparent substrate. The reflective layer has a refractive index of at least 2.5 at a wavelength $\lambda$ of light beams. The second information layer is a reflectance-increase type where the reflectance with respect to the light beams incident from the transparent substrate side after recording is higher than that before recording. It is possible not to provide the optical interference layer if the ratio $n_1/n_2$ of the refractive index $n_1$ at the wavelength $\lambda$ of the recording layer before recording to the refractive index $n_2$ thereof after recording is not more than 0.8.

9 Claims, 6 Drawing Sheets

OPTICAL INFORMATION RECORDING MEDIUM, METHOD FOR PRODUCING THE SAME, AND METHOD AND APPARATUS FOR RECORDING/REPRODUCING INFORMATION THEREON

BACKGROUND OF THE INVENTION

1. Field of the Invention

The present invention relates to an optical information recording medium that allows information signals to be recorded/reproduced with high quality by irradiating a thin film formed on a substrate with a high energy beam such as a laser beam, a method for producing the same, and a method and an apparatus for recording/reproducing information thereon.

2. Description of the Prior Art

Conventionally, it is known that it is possible to cause a phase change between an amorphous phase and a crystalline phase, which have different optical constants (refractive index n and extinction coefficient k), by irradiating a thin film made of a chalcogen material formed on a substrate with a laser light beam for local heating under different irradiation conditions. Utilizing this phenomenon, a so-called phase changeable optical information recording medium has been under development.

In the phase changeable optical information recording medium, a new signal can be recorded while erasing an existing recorded signal, using only a single laser beam, by modulating the laser output between two levels of a recording level and an erasing level in accordance with the information signal and irradiating an information track with the single laser beam. This method does not require a magnetic circuit component as required by optical magnetic recording. Therefore, this method is advantageous for recording information in that the head can be simplified and erasure and recording can be performed simultaneously so that a period of time required for rewriting can be shortened.

In such an optical information recording medium, the following structure is common. Dielectric layers having excellent heat resistance are provided as protective layers above and below a recording layer for the purpose of preventing the evaporation of the recording layer and the thermal deformation of the substrate that might occur during repeated use. Furthermore, a reflective layer made of a metal material is provided on the protective layer on the side opposite to the substrate for the purpose of efficiently using incident light and increasing the cooling rate so as to facilitate a change to an amorphous state. Thus, in general, at least four thin films are laminated to form the optical information recording medium.

In order to produce a phase changeable optical information recording medium with high density and large capacity, the following attempts are commonly carried out: forming a smaller mark by using a shorter wavelength of the light source or a higher NA (numerical aperture) of the object lens used for recording, and thus improving the linear density in the circumferential direction and the track density in the radial direction of the recorded mark on the substrate. Furthermore, mark edge recording in which information is defined by the length of the mark has been proposed to improve the linear density, and land & groove recording in which information is recorded both on grooves for guiding laser light formed on the substrate and lands between the guide grooves has been proposed to improve the track density, and both recording methods are adopted.

Furthermore, it was proposed that a plurality of such recordable information layers are laminated via separating layers so that the capacity is increased (e.g., JP 9-212917A). Moreover, layer recognition means and layer switching means for selecting one of these information layers for recording and reproduction were proposed (e.g. JP10-505188 A).

Improving not only high density but also data processing rates, namely, the velocity of recording/reproducing information, is important. For this reason, improving the linear velocity by rotating a disk at a higher revolution per minute with the radius position unchanged for recording and reproduction is under research.

In the case of overwriting with a single beam, the amorphous portion and the crystalline portion have different end-point temperatures when they are irradiated with beams of the same power level, because the amorphous portion and the crystalline portion have different light absorptances, and the crystalline portion requires a latent heat of fusion. Therefore, when overwriting a signal, the shape of the mark is distorted by the influence of a signal that has been recorded before the overwriting. This mark distortion causes an increase of errors (jitters) in the time axis direction of reproducing signals or a drop of the erasure ratio. The problem caused by this phenomenon becomes more serious as higher linear velocity and higher density are achieved.

In order to solve this problem, a method of equalizing the end-point temperature of the amorphous and crystalline portions irradiated with beams of the same power level was proposed (e.g., JP 1-149238A). This method requires that the absorptance ratio Ac/Aa is more than 1.0, where Ac is the absorptance of the crystalline portion, and Aa is the absorptance of the amorphous portion with respect to a laser light beam of wavelength $\lambda$, in order to compensate the latent heat of fusion in the crystalline portion. In addition, when Rc is the reflectance of the crystalline portion, and Ra is the reflectance of the amorphous portion with respect to a laser light beam of wavelength $\lambda$, the larger absolute value of the difference in the reflectance $\Delta R = Rc - Ra$ is more desirable for larger signal amplitudes and higher C/N ratios.

There are two ways of increasing the absolute value of $\Delta R$, namely, a reflectance-decrease-type in which $\Delta R$ is positive and a reflectance-increase-type in which $\Delta R$ is negative. In the reflectance decrease-type, Rc can be raised easily, so that the reflectance as the base can be raised, and Ra can be substantially 0. Therefore, this is advantageous in that the contrast of a signal can be large. On the other hand, as described above, either one of the following is necessary in order to increase Ac/Aa at the same time: transmitting part of the incident light or allowing light to be absorbed by a portion other than the recording layer. This is disadvantageous in efficiently utilizing the incident light and in the freedom degree in the optical design. On the other hand, in the reflectance-increase-type, Ac/Aa can be increased at the same time when the absolute value of $\Delta R$ is increased. Therefore, it is not necessary to transmit part of the incident light or to allow light to be absorbed by a portion other than the recording layer. This is advantageous in efficiently utilizing the incident light and in the freedom degree in the optical design.

Examples of the structure of such a reflectance-increase-type recording medium are as follows: A structure is such that at least five layers of a semitransparent optical interference layer made of Au or the like, a lower protective layer, a recording layer, an upper protective layer and a reflective layer are formed in this order on a substrate, and the absolute value of ΔR is increased by the reflectance-increase-type technique utilizing the interference effect of light, especially by the optical interference layer (e.g., JP 7-78354A, JP 7-105574A and JP 7-262607A); and another structure is such that at least six layers of a protective layer with a high refractive index, a protective layer with a low refractive index, a protective layer with a high refractive index, a recording layer, an upper protective layer and a reflective layer are formed in this order on a substrate.

In the conventional reflectance-increase-type recording medium, a metal material such as Au and Al or an alloy material based on these metals is used as the reflective layer. All of these reflective layer materials have an refractive index n of less than 2.5, an extinction coefficient k of 3 or more, and a heat conductivity of more than 50 W/(m·K), so that they are classified in the class of thin film materials having a high heat conductivity. Therefore, since the cooling effect by the reflective layer is too large, the laser diodes that are available at the moment have insufficient power, so that the recording layer cannot be warmed sufficiently. Thus, a mark cannot be formed completely in some cases (insufficient sensitivity). Alternatively, thermal diffusion becomes large in the plane of the film during recording, so that a mark in an adjacent track may be erased (cross erase).

As described above, in the recording medium in which a plurality of information layers are laminated via separating layers for larger capacity, the insufficient sensitivity problem is even more serious, because recording/reproducing information in the second and subsequent information layers from the side to which laser light for recording/reproduction is incident is performed with the quantity of light that has been reduced by the reflection and/or the absorption when the light passes through the first information layer.

Furthermore, when the laser light has a short wavelength for high density recording, the output from the laser light source tends to be reduced. For this reason, the insufficient sensitivity may constitute a problem also in a medium including a single information layer.

SUMMARY OF THE INVENTION

Therefore, with the foregoing in mind, it is an object of the present invention to provide an optical information recording medium with high sensitivity while achieving a C/N ratio for high density and high linear velocity for overwriting, a high erasure ratio, and reduced cross erase. It is another object of the present invention to provide a method for producing such an optical information recording medium, a method for recording/reproducing information thereon, and an apparatus for recording/reproducing information thereon.

In order to achieve the above object, a first optical information recording medium of a preferable embodiment of the present invention includes a first information layer, a separating layer, a second information layer and a protective substrate in this order on a transparent substrate, wherein the second information layer comprises an optical interference layer, a lower protective layer, a recording layer that changes between two different states detectable optically by irradiation of light beams, an upper protective layer, and a reflective layer whose refractive index is at least 2.5 at a wavelength λ of light beams used for recording in this order from the side near the transparent substrate, and the reflectance of the second information layer with respect to the light beams used for recording incident from the transparent substrate side after recording is higher than that before recording.

This optical information recording medium belongs to the category of a so-called reflectance-increase type and is provided with the optical interference layer in addition to the reflective layer. The optical interference layer serves to enlarge the increase of the reflectance (difference in the reflectance before and after recording) with optical interference.

More specifically, it is preferable that the refractive index of the optical interference layer at a wavelength λ is not less than 2, and the extinction coefficient thereof is not more than 2, or that the refractive index of the optical interference layer at a wavelength λ is not more than 1, and the extinction coefficient thereof is not less than 3.

Furthermore, it is preferable that the heat conductivity of the optical interference layer is not more than 50 W/(m·K). This is advantageous for improving the sensitivity.

The above optical information recording medium can include a first optical interference layer and a second optical interference layer in this order from the side near the transparent substrate. In this case, it is preferable that the refractive index of the second optical interference layer at a wavelength λ is smaller than that of the first optical interference layer and is smaller than that of the lower protective layer, and that the extinction coefficient of the first optical interference layer and the extinction coefficient of the second optical interference layer are both not more than 1.

Furthermore, a second optical information recording medium of a preferable embodiment of the present invention includes a first information layer, a separating layer, a second information layer and a protective substrate in this order on a transparent substrate, wherein the second information layer comprises a lower protective layer, a recording layer that changes between two different states detectable optically by irradiation of light beams, an upper protective layer, and a reflective layer whose refractive index is at least 2.5 at a wavelength λ of light beams used for recording in this order from the side near the transparent substrate. The lower protective layer is formed directly on the separating layer. The ratio $n_1/n_2$ of the refractive index $n_1$ at the wavelength λ of the recording layer before recording to the refractive index $n_2$ thereof after recording is not more than 0.8. The reflectance after recording of the second information layer with respect to the light beams used for recording incident from the transparent substrate side is higher than that before recording.

Although the above optical information recording medium belongs to the category of the so-called reflectance-increase type, the optical interference layer is not present between the separating layer and the lower protective layer. In this medium, the recording layer having a ratio $n_1/n_2$ of the refractive index $n_1$ at the wavelength λ before recording to the refractive index $n_2$ thereof after recording of not more than 0.8 is used instead of using the optical interference layer.

In the first and second optical information recording media, it is preferable that the first information layer comprises a recording layer that changes between two different states detectable optically by irradiation of light beams, and the first information layer has a transmittance of at least 30% with respect to the light beams used for recording. This is advantageous for improving the sensitivity.

The recording layer in the second optical information recording medium can be used not only for a medium provided with the two information layers, but in a wide range of applications. A third optical information recording medium including this recording layer of the present invention includes a lower protective layer, a recording layer that changes between two different states detectable optically by irradiation of light beams, an upper protective layer, and a reflective layer whose refractive index n is at least 2.5 at a wavelength $\lambda$ of light beams used for recording on the transparent substrate. The lower protective layer is formed directly on the transparent substrate. The ratio $n_1/n_2$ of a refractive index $n_1$ at the wavelength $\lambda$ of the recording layer before recording to a refractive index $n_2$ thereof after recording is not more than 0.8. The reflectance after recording of the medium with respect to the light beams used for recording incident from the transparent substrate side is higher than that before recording.

In the first, second and third optical information recording media of the present invention, it is preferable that the refractive index at the wavelength $\lambda$ of the reflective layer is not less than 3.0, and the extinction coefficient k at the wavelength $\lambda$ of the reflective layer is not more than 4.0.

Furthermore, it is preferable that the heat conductivity of the reflective layer is not more than 50 W/(m·K). In particular, when the heat conductivities of the optical interference layer and the reflective layer are both in the above range, the medium can be most suitable for improving the sensitivity.

Furthermore, it is preferable that the above optical information recording medium further includes an interface layer at at least one interface selected from the group consisting of an interface between the lower protective layer and the recording layer and an interface between the recording layer and the upper protective layer.

Furthermore, in the above optical information recording medium, it is preferable that the recording layer comprises Ge, Sb and Te.

Furthermore, in the above optical information recording medium, it is preferable that $0.10 \leq x \leq 0.50$ and $0.40 \leq z \leq 0.60$ are satisfied, wherein a ratio by number of atoms of Ge, Sb and Te is expressed by x:y:z (x+y+z=1).

Furthermore, in the above optical information recording medium, it is preferable that the reflective layer comprises at least one element selected from the group consisting of Ti, Zr, Hf, V, Nb, Ta, Cr, Mo, W, Mn, Zn, Cd, Si, Ge, Sn, Pb, Sb, Bi, and Te.

In order to achieve the above object, a method for producing an optical information recording medium of the present invention is a method for producing the first or the second optical information recording medium, and includes forming the first information layer on the transparent substrate and forming the second information layer on the protective substrate; attaching the transparent substrate and the protective substrate via the separating layer in such a manner that the first information layer faces the second information layer; and initializing the first information layer and the second information layer so that the two layers are in a recordable initialized state.

In the above method for producing an optical information recording medium, it is preferable that the extinction coefficient of the reflective layer at a wavelength $\lambda$ of light beams is not more than 4.0, and the initialization is performed by irradiating the first information layer with the light from the transparent substrate side and irradiating the second information layer with the light from the protective substrate side, after the attachment process.

In order to achieve the above object, a method for recording/reproducing information on an optical information recording medium of the present invention is a method of recording/reproducing information on the first or second optical information recording medium, and is characterized in that information is recorded/reproduced on the first information layer and the second information layer with the light beams incident from the transparent substrate side.

In the above method for recording/reproducing information on an optical information recording medium, it is preferable that at least a part of a mark to be recorded is recorded on the recording layer with light beams with a pulse train including a plurality of pulses that are modulated between power level P1 and power level P3, and the light beams are kept constant at power level P2 when a mark is not formed (P1>P2$\geq$P3$\geq$0), where P1 is a power level sufficient to melt an irradiated portion of the recording layer instantly, and P2 and P3 are power levels that cannot melt the irradiated portion instantly.

Furthermore, in the above method for recording/reproducing information on an optical information recording medium, it is preferable that a cooling section of power level P4 is provided after a last pulse of a recording pulse train, where P2>P4$\geq$0.

In order to achieve the above object, an apparatus for recording/reproducing information on an optical information recording medium of the present invention is an apparatus for recording/reproducing information on the first or second optical information recording medium, and includes layer recognition means and layer switching means for recording/reproducing information on the optical information recording medium, wherein the information is recorded/reproduced on the first information layer and the second information layer with the light beams incident from the transparent substrate side.

The above apparatus for recording/reproducing information on an optical information recording medium further includes light beam-intensity-modulating means for recording at least a part of a mark to be recorded on the recording layer with light beams with a pulse train including a plurality of pulses that are modulated between power level P1 and power level P3, while keeping the light beams constant at power level P2 when a mark is not formed (P1>P2$\geq$P3$\geq$0), where P1 is a power level sufficient to melt an irradiated portion of the recording layer instantly, and P2 and P3 are power levels that cannot melt the irradiated portion instantly.

Furthermore, it is preferable that the light beam-intensity-modulating means provides a cooling section of power level P4 after a last pulse of a recording pulse train, where P2>P4$\geq$0.

As described above, the present invention provides an optical information recording medium having a high C/N ratio, a high erasure ratio and high sensitivity for overwriting in high density and at high linear velocity, and having reduced cross erase and a large capacity.

These and other advantages of the present invention will become apparent to those skilled in the art upon reading and understanding the following detailed description with reference to the accompanying figures.

DESCRIPTION OF THE PREFERRED EMBODIMENTS

Hereinafter, preferable embodiments of the present invention will be described with reference to the accompanying drawings.

Figure 1:
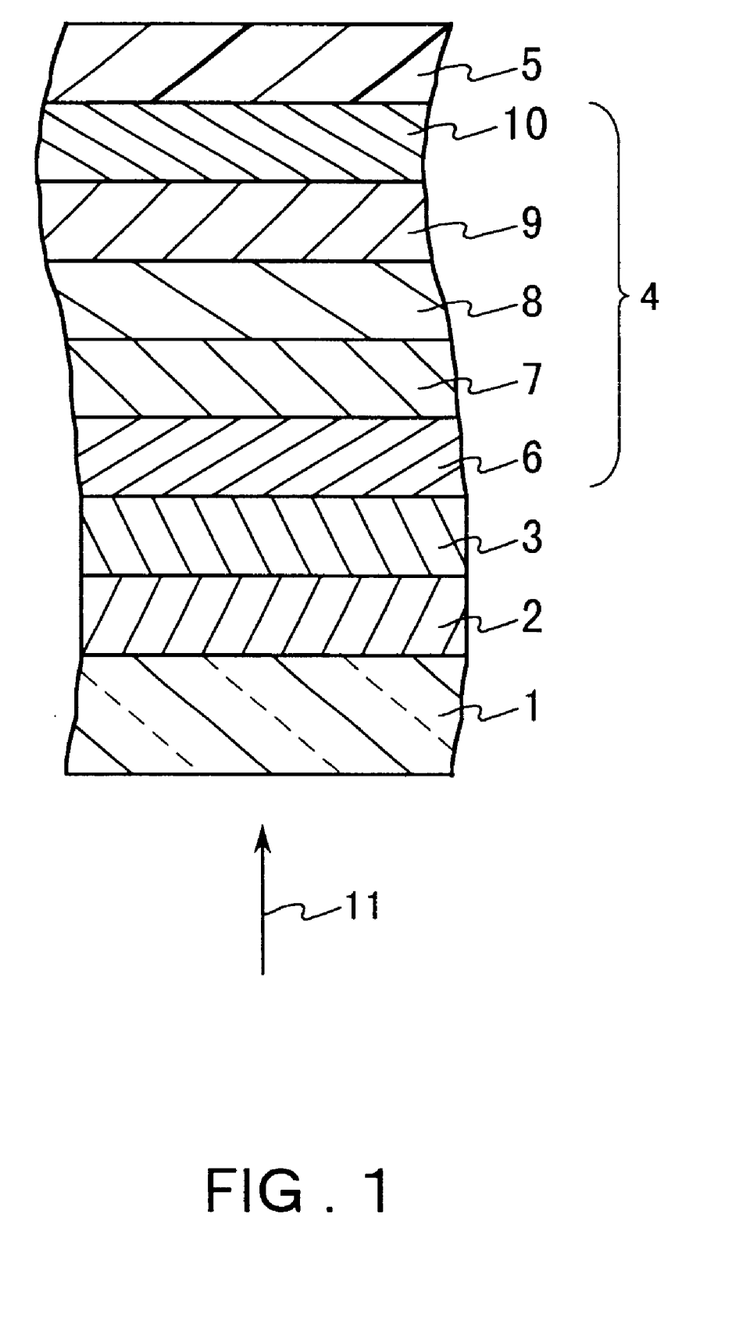
FIG. 1 is a cross-sectional view showing an embodiment of an optical information recording medium of the present invention.

FIG. 1 is a cross-sectional view showing the structure of an embodiment of an optical information recording medium of the present invention. This medium includes a first information layer 2, a separating layer 3, a second information layer 4 and a protective substrate 5 in this order on a transparent substrate 1. The second information layer includes an optical interference layer 6, a lower protective layer 7, a recording layer 8, an upper protective layer 9 and a reflective layer 10 in this order from the side near the transparent substrate 1.

Figure 2:
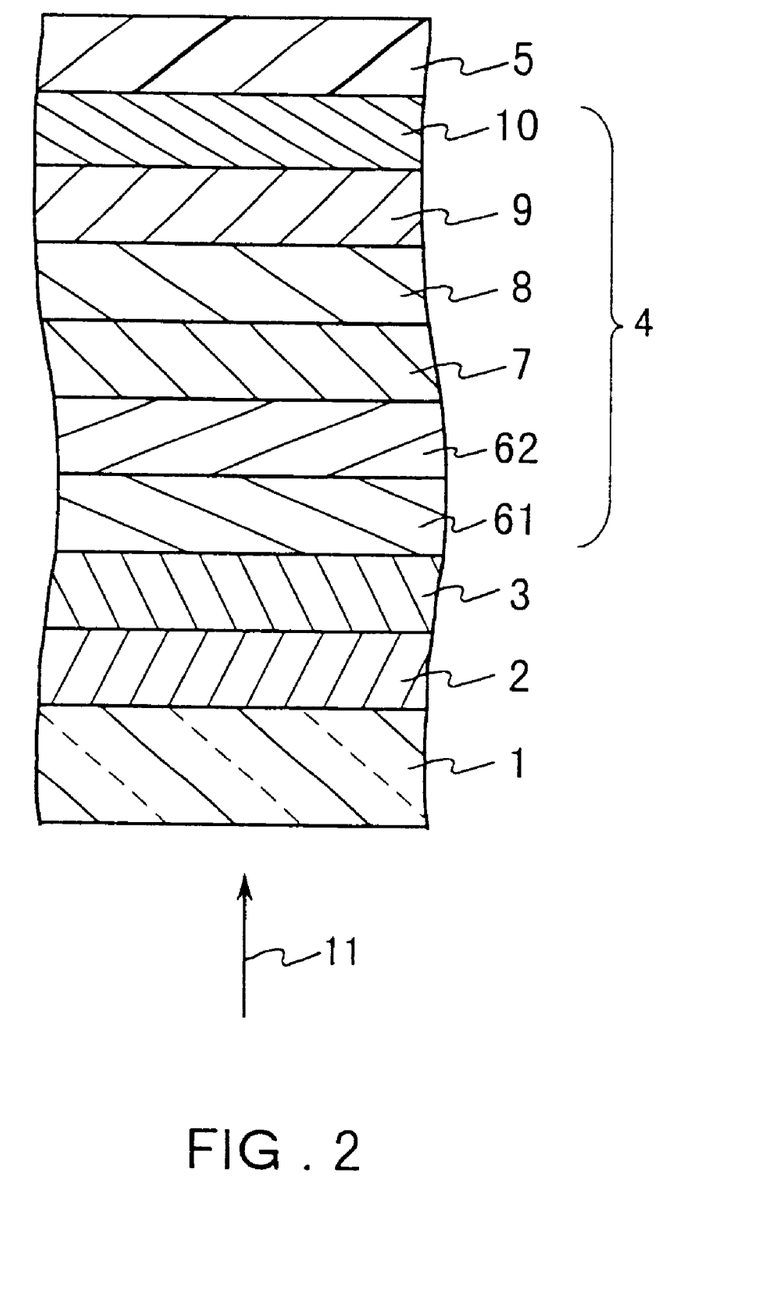
FIG. 2 is a cross-sectional view showing another embodiment of an optical information recording medium of the present invention.

As the optical interference layer 6, the optical information recording medium of the present invention can include a laminate of two layers of a first optical interference layer 61 and a second interference layer 62, which are formed in this order from the side near the transparent substrate 1, as shown in FIG. 2.

Figure 3:
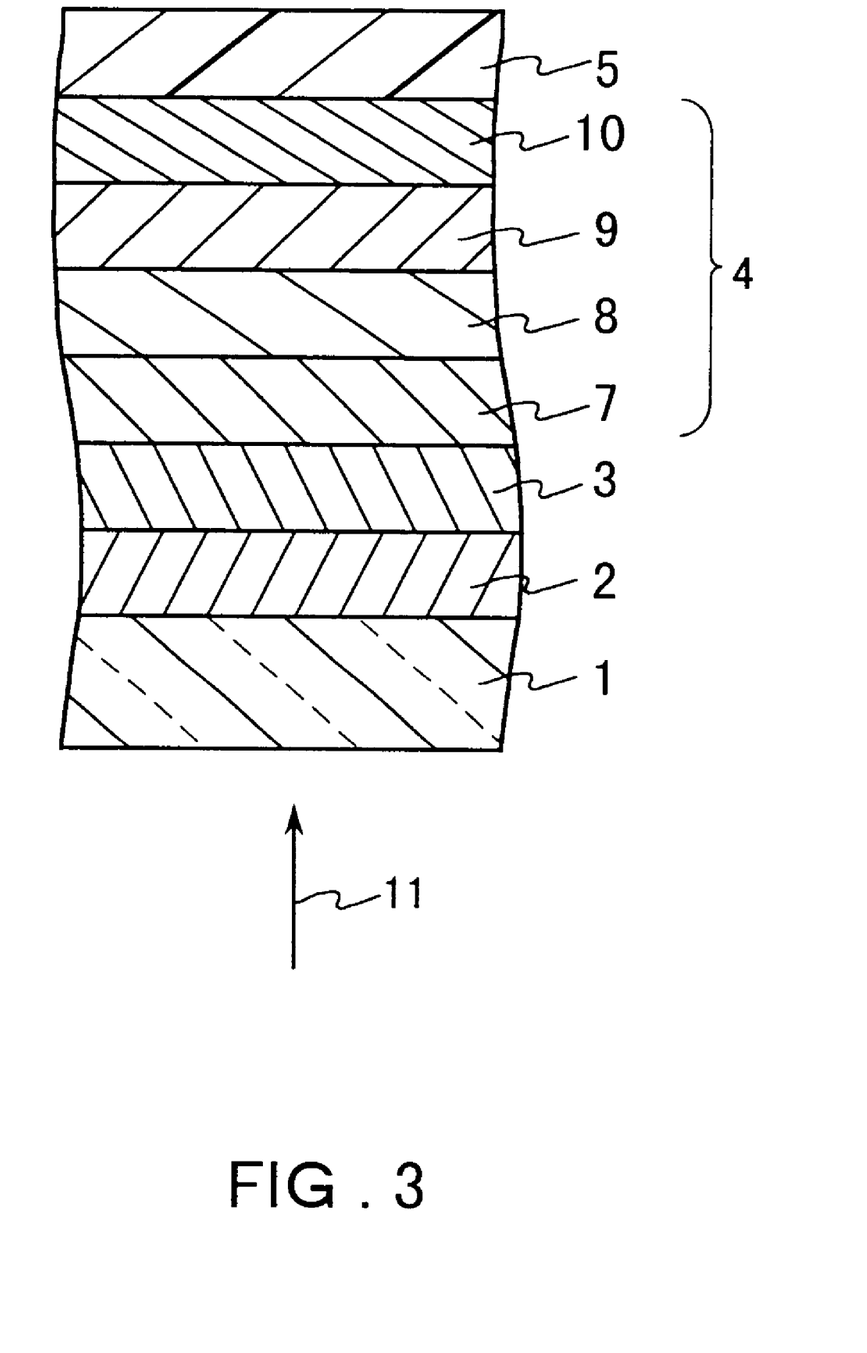
FIG. 3 is a cross-sectional view showing still another embodiment of an optical information recording medium of the present invention.
Figure 4:
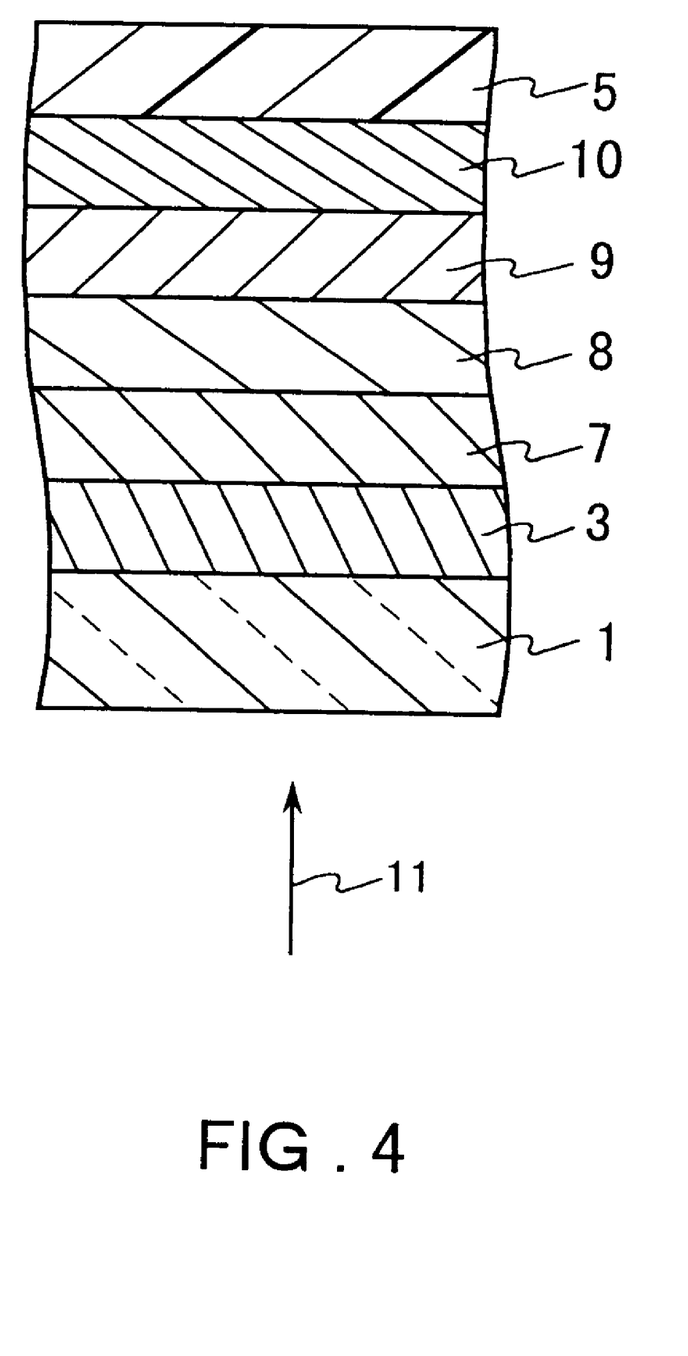
FIG. 4 is a cross-sectional view showing yet another embodiment of an optical information recording medium of the present invention.

In some cases, depending on the optical constants of the recording layer 8, the optical interference layer 6 is not necessarily formed, as shown in FIG. 3. The recording medium in this case can be used also as a recording medium provided with a single information layer, as shown in FIG. 4.

The optical information recording medium of the present invention may include films other than the layers shown in FIGS. 1 to 4.

In these media, recording/reproduction can be performed with respect to both the first information layer 2 and the second information layer 4 by irradiating the media with laser light 11 from the side of the transparent substrate 1.

A polycarbonate resin, a polymethyl methacrylate resin, a polyolefin resin, an Arton resin (norbornene resin), glass or the like can be used as a material for the transparent substrate 1. The thickness of the transparent substrate 1 is not limited to a particular value, but preferably is about 0.1 to 2.0 mm. Furthermore, it is preferable that spiral or concentric circular grooves for the tracking guide of the laser light 11 have been formed on the surface of the transparent substrate 1 on which the films are to be formed.

It is preferable that a material having a refractive index n of 2 or more and an extinction coefficient k of 2 or less at a wavelength λ of the laser light 11 or a material having a refractive index n of 1 or less and an extinction coefficient k of 3 or more is used as the optical interference layer 6 for the purpose of achieving the reflectance-increase-type (the difference ΔR in the reflectance associated with recording is negative) and facilitating an increase in the absolute value thereof.

Furthermore, in order to improve the sensitivity, it is preferable that the heat conductivity is low, for example, 50 W/(m·K) or less, or that the thickness is 20 nm or less when the heat conductivity is 50 W/(m·K) or more. For example, for a wavelength region for red color of about 600 to 800 nm wavelengths, a single-element substance of Au, Ag, Cu or the like or a material comprising at least one of these elements as the main component and other elements, which are added as appropriate, such as Ag—Pd, Ag—Cu—Pd, Ag—Pd—Ti or the like can be used as the material having a refractive index n of 1 or less and an extinction coefficient k of 3 or more. Alternatively, a single-element substance of Si, Ge or the like or a material comprising at least one of these elements as the main component and other elements, which are added as appropriate, such as Si—W, Si—Cr, Ge—Si—Cr or the like can be used as the material having a refractive index n of 2 or more and an extinction coefficient k of 2 or less. In the specification, the main component refers to a component contained in an amount of greater than 50 wt %.

For the lower protective layer 7 and the upper protective layer 9, it is preferable to use a material that is physically and chemically stable, has a higher melting point and a higher softening temperature than the melting point of the recording layer and does not form a solid solution with the material of the recording layer, for the purpose of suppressing noise increase caused by thermal damage of the protective substrate, the recording layer or the like during irradiation of the laser light 11 and adjusting the reflectance, the absorptance and the phase of reflected light.

Examples of such a material include an oxide of Y, Ce, Ti, Zr, Nb, Ta, Co, Zn, Al, Si, Ge, Sn, Pb, Sb, Bi, Te or the like, a nitride of Ti, Zr, Nb, Ta, Cr, Mo, W, B, Al, Ga, In, Si, Ge, Sn, Pb or the like, a carbide of Ti, Zr, Nb, Ta, Cr, Mo, W, Si or the like, a sulfide, a selenide or a telluride of Zn, Cd or the like, a fluoride of Mg, Ca or the like, a single-element substance of C, Si, Ge or the like, or a dielectric or a quasi-dielectric material comprising a mixture of these substances. The lower protective layer 7 and the upper protective layer 9 can be formed of different materials, if necessary, or can be formed of the same material.

For the recording layer 8, it is preferable to use a material whose optical constants (refractive index n and extinction coefficient k) are changed by irradiation of laser light. Examples of such a material include a chalcogenide based on Te or Se, for example, alloys comprising Ge—Sb—Te, Ge—Te, Pb—Ge—Sb—Te, In—Sb—Te, Sb—Te, Ag—In—Sb—Te, Ge—Sb—Bi—Te, Ge—Sb—Se—Te, Ge—Sn—Te, Ge—Sn—Te—Au, Ge—Sb—Te—Cr, In—Se, In—Se—Co or the like as the main component, or alloys comprising these and nitrogen, oxygen or the like, which are added as appropriate.

The reflective layer (a high refractive index material layer) 10 can be a material having a refractive index n of 2.5 or more, preferably 3.0 or more at a wavelength λ of laser light for the purpose of achieving the reflectance-increase type, namely, making ΔR negative, facilitating achieving a large absolute value thereof, and adjusting the cooling rate. For example, a material comprising one or more elements selected from the group consisting of Ti, Zr, Hf, V, Nb, Ta, Cr, Mo, W, Mn, Zn, Cd, Si, Ge, Sn, Pb, Sb, Bi, and Te can be used. Among these materials, materials having a low heat conductivity (e.g., 50 W/(m·K) or less) are more preferable for the purpose of improving the sensitivity. In the case where an oxide, a nitride, a carbide, a fluoride, a boride, a sulfide, or a selenide of the above elements, or a compound comprising a plurality of the elements is used, a composition in the vicinity of the stoichiometric composition can be used, or a composition off the stoichiometric composition can be used, if necessary. Alternatively, a mixture of these can be used.

As shown in FIG. 2, in the case where the first optical interference layer 61 and the second optical interference layer 62 are used as the optical interference layer 6, the dielectric or the quasi-dielectric materials listed for the lower protective layer 7 and the upper protective layer 9 can be used. In this case, it is preferable that the materials of each layer are selected for combination so that the refractive index of the second optical interference layer at a wavelength $\lambda$ of laser light is smaller than that of the first interference layer and the lower protective layer 7, which are adjacent to the second interference layer, so as to achieve the reflectance-increase-type, to make $\Delta R$ negative, and to make the absolute value large.

It is sufficient to use an information layer that can be recorded/reproduced by the laser light 11 as the first information layer 2, as in the case of the second information layer 4. For example, the information layer can have a multilayer structure including at least a recording layer made of a material listed for the recording layer 8 and protective layers made of a material listed for the protective layer provided on both sides of this recording layer. In this case, it is preferable that at least 30% of the light quantity of the laser light 11 passes through the first information layer to record/reproduce information on the second information layer 4.

The first information layer 2 can be a read-only layer on which information cannot be recorded but that allows the information previously stored on the surface of the transparent substrate 1 in the form of the concave-convex pattern to be reproduced. The first information layer and the separating layer are not necessarily provided, although the amount of information that can be stored per medium is reduced.

For the separating layer 3, it is preferable to use a material that is transparent at a wavelength $\lambda$ of laser light and has high heat resistance and high adhesion to perform recording/reproducing each of the first information layer and the second information layer with the laser light 11. For example, an adhesive resin (e.g., an ultraviolet curable resin), a two-faced tape, a dielectric film or the like can be used. The thickness of the separating layer 3 preferably is 2 $\mu$m or more to prevent signal information recorded on either one of the first information layer 2 and the second information layer 4 from disturbing recording/reproduction of signal information on the other information layer. Moreover, the total of the thickness of the separating layer and the substrate thickness is required to be within the range of the tolerance of the substrate thickness, for example, 100 $\mu$m or less, so that the laser light 11 can be focused on both the first information layer 2 and the second information layer 4.

As the protective substrate 5, the same material as for the transparent substrate can be used, or a material that is not transparent can be used. The protective substrate 5 can have a different thickness or a different groove shape from those of the transparent substrate 1. For example, the direction of the spiral can be opposite. Furthermore, it is possible to form guide grooves for the second information layer on the surface of the separating layer on the side of the second information layer by a 2P (photo-polymerization) method. The protective substrate can be attached to the second information with an adhesive or the like, or can be formed as an overcoat resin layer by spin coating.

An interface layer can be provided at at least one interface between the lower protective layer 7 and the recording layer 8 and between the recording layer 8 and the upper protective layer 9 to suppress mutual diffusion of atoms at the layer interfaces during repeated recording. A similar interface layer can be provided adjacent to the recording layer of the first information layer.

The interface layer can be formed by selecting a dielectric material that carries out the above function suitably from the materials listed for the protective layer. In particular, a nitride, an oxide or a carbide of Ge, Si, Al, Cr or the like, or a material comprising a mixture of these as the main component is most preferable.

Hereinafter, an embodiment of an example of a method for producing the optical information recording medium will be described. This producing method includes a film-formation process, an attachment process and an initialization process, which are performed in this order.

In the film-forming process, a first information layer 2 is formed on a surface of a transparent substrate 1 on which guide grooves have been formed beforehand. A second information layer 4 is formed on a surface of a protective substrate 5 on which guide grooves have been formed beforehand. These information layers can be formed by a regular vapor deposition method for forming a thin film, such as vacuum deposition, sputtering, ion plating, a CVD (chemical vapor deposition) method, and an MBE (molecular beam epitaxy) method. Among these, sputtering is most preferable, because the advantages and the disadvantages in the film formation rate, the production cost and the quality of the obtained film are balanced. The films generally are formed while allowing inert gas to flow in a chamber under high vacuum. The layer may be formed while mixing oxygen, nitrogen or the like with the inert gas. Thus, oxygen atoms or nitrogen atoms are contained in the film so that the characteristics of the film or the bonding state of the atoms can be adjusted. The mixture of these atoms may be effective to improve the repetition characteristics or the resistance to humidity.

In the attachment process, the transparent substrate 1 and the protective substrate 5 are attached via a separating layer 3 in such a manner that the surfaces of the films are opposed to each other (the first information layer faces the second information layer). The attachment process, for example, is performed by applying an ultraviolet curable resin onto either one of the surfaces of the films by spin coating or the like, pressing the two substrates for tight attachment, and irradiating the substrate with ultraviolet light to cure the ultraviolet curable resin.

In the initialization process, the entire surface is initialized (generally crystallized) by irradiating the first information layer 2 and the second information layer 4 with energy light such as laser light from the transparent substrate 1 and the protective substrate 5, respectively.

The optical characteristics of the above medium will be described below. The refractive index, the extinction coefficient and the thickness of each layer of the multi-layered film are determined. With respect to all the interfaces, an equation for light energy balance at each interface is formulated based on the law of the conservation of energy, and the simultaneous equations for all the interfaces are solved, so that the reflectance and the transmittance of the entire multi-layered film with respect to the incident light beams and the absorptance of each layer can be calculated. This approach is well-known, for example, as a matrix method (e.g., "Wave Optics" by Hiroshi Kubota et al., Iwanami Shoten, 1971).

Herein, for example, the values of Ra, Rc, Ac and Aa were calculated with respect to a multi-layered structure medium, such as the second information layer 4, including the substrate or resin layer/the optical interference layer/the lower protective layer/the recording layer/the upper protective layer/the reflective layer/the substrate or resin layer from the side to which laser beam (a wavelength of 660 nm) is incident. The calculation was performed with the following refractive index n and extinction coefficient k: n=1.6 and k=0.0 for the substrate or resin layer; n=4.0 and k=0.2 (thickness of 30 nm) for the optical interference layer; n=2.1 and k=0.0 for the lower protective layer; n=4.1 and k=1.6 in the amorphous state of the recording layer; n=3.9 and k=4.2 (thickness of 10 nm) in the crystalline state thereof; n=2.1 and k=0.0 for the upper protective layer, and various combinations of n and k for the reflective layer made of various high refractive index materials. Table 1 shows the results when the maximum $|\Delta R|$ max of the absolute value of $\Delta R$ that is negative in the range $Rc \geq 15\%$ was obtained while changing the thicknesses of the lower protective layer, the upper protective layer and the reflective layer.

TABLE 1

| n\k | 0 | 1 | 2 | 3 | 4 | 5 | 6 |
|---|---|---|---|---|---|---|---|
| 0.5 | C | B | B | A | A | A | A |
| 1.0 | C | C | B | A | A | A | A |
| 1.5 | D | D | C | B | A | A | A |
| 2.0 | D | D | C | B | B | A | A |
| 2.5 | C | D | D | C | B | A | A |
| 3.0 | B | C | C | C | B | A | A |
| 3.5 | A | B | B | B | A | A | A |
| 4.0 | A | A | A | A | A | A | A |
| 4.5 | A | A | A | A | A | A | A |
| 5.0 | A | A | A | A | A | A | A |

A: $|\Delta R| \geq 25\%$ is satisfied.
B: $|\Delta R| \geq 20\%$ is satisfied.
C: $|\Delta R| \geq 15\%$ is satisfied.
D: $|\Delta R| \geq 15\%$ is not satisfied.

Table 1 indicates that the optical constants (n, k) of the reflective layer that achieves a large $|\Delta R|$ max are in the range where n is less than 2.5 and k is 3.0 or more, and in the range where n is 2.5 or more. For any n and k, Ac/Aa is larger than 1.5.

Any materials can be used that are conventionally used for the reflective layer of the reflectance-increase type recording medium, such as Al, Au or an alloy thereof have n of less than 2.5 and k of 3.0 or more, as long as it is in the range that achieves a large $|\Delta R|$ max (Table 1). However, these materials have large heat conductivity so that they are not suitable to improve the sensitivity. In addition, the heat distribution of the recording layer during recording is sharp in the film-thickness direction, and becomes moderate in the inplane direction, so that cross erase become significant.

On the other hand, in the range where n is 2.5 or more, there are materials having a low heat conductivity such as various dielectric materials, semimetal or semiconductor materials, and metal materials that have low heat conductivity, such as Si and Ge. Table 1 confirms that the reflective layer 10 made of these materials is not optically inferior to the reflective layer made of Al, Au or an alloy thereof, namely, can achieve the reflectance-increase type and provide sufficient reflectance change. Furthermore, it is expected that high sensitivity can be obtained because of the low conductivity. In addition, it is believed that the heat distribution of the recording layer during recording becomes sharp in the inplane direction, and becomes moderate in the film-thickness direction, so that cross erase can be reduced.

When a material having a low heat conductivity is used for the reflective layer 10, and a material having a low heat conductivity is used also for the optical interference layer or the optical interference layer is not provided, the cooling rate of the recording layer becomes slow during recording, so that it may be difficult to change the recording layer to be amorphous. However, this problem can be solved by using a material having a composition appropriately different from the stoichiometric composition that provides high crystallization speed or a composition containing a suitable ratio of impurities other than the constituent elements as the material for the recording layer for easy change to an amorphous state.

The above-described problem also can be solved by forming an additional reflective layer having a high cooling ability on the side farther from the recording layer. In general, the reflective layer having a high cooling ability prevents the recording layer from being warmed and causes the deterioration of the sensitivity. However, when this reflective layer is used in combination with the reflective layer having a low heat conductivity as used in the above embodiment, the problem of the deterioration of the sensitivity is not caused.

The same calculation as above was performed with respect to a medium (FIG. 2) with a multi-layered structure where a first interference layer and a second interference layer are provided in this order in place of the above optical interference layer. In this case, the first optical interference layer had n=2.1, k=0.0, and a thickness of 70 nm, and the second optical interference layer had n=1.5, k=0.0, and a thickness of 100 nm. As Table 2 shows, the results were substantially the same as those shown in Table 1.

TABLE 2

| n\k | 0 | 1 | 2 | 3 | 4 | 5 | 6 |
|---|---|---|---|---|---|---|---|
| 0.5 | C | B | B | A | A | A | A |
| 1.0 | C | C | B | A | A | A | A |
| 1.5 | D | D | C | B | A | A | A |
| 2.0 | D | D | C | B | B | A | A |
| 2.5 | C | D | D | C | B | A | A |
| 3.0 | B | C | C | C | B | A | A |
| 3.5 | A | B | B | B | A | A | A |
| 4.0 | A | A | A | A | A | A | A |
| 4.5 | A | A | A | A | A | A | A |
| 5.0 | A | A | A | A | A | A | A |

A: $|\Delta R| \geq 25\%$ is satisfied.
B: $|\Delta R| \geq 20\%$ is satisfied.
C: $|\Delta R| \geq 15\%$ is satisfied.
D: $|\Delta R| \geq 15\%$ is not satisfied.

Furthermore, the same calculation as above was performed with respect to a medium (FIG. 3) that is not provided with the optical interference layer. Table 3 shows the results. Furthermore, the same calculation as above was performed with respect to a medium where the optical interference layer is not provided and the refractive index in the crystalline state of the recording layer was smaller (n=2.0). Table 4 shows the results.

TABLE 3

| n\k | 0 | 1 | 2 | 3 | 4 | 5 | 6 |
|---|---|---|---|---|---|---|---|
| 0.5 | D | D | C | C | B | B | B |
| 1.0 | D | D | D | C | C | B | B |
| 1.5 | D | D | D | D | C | C | B |
| 2.0 | D | D | D | D | X | C | B |
| 2.5 | D | D | D | D | C | C | B |
| 3.0 | D | D | D | D | C | C | B |
| 3.5 | D | D | D | C | C | C | B |
| 4.0 | C | D | C | C | C | B | B |
| 4.5 | C | C | C | B | B | B | B |

TABLE 3-continued

| n\k | 0 | 1 | 2 | 3 | 4 | 5 | 6 |
|---|---|---|---|---|---|---|---|
| 5.0 | B | C | B | B | B | B | B |

A: $|\Delta R| \geq 25\%$ is satisfied.
B: $|\Delta R| \geq 20\%$ is satisfied.
C: $|\Delta R| \geq 15\%$ is satisfied.
D: $|\Delta R| \geq 15\%$ is not satisfied.

TABLE 4

| n\k | 0 | 1 | 2 | 3 | 4 | 5 | 6 |
|---|---|---|---|---|---|---|---|
| 0.5 | D | C | B | A | A | A | A |
| 1.0 | D | D | C | B | A | A | A |
| 1.5 | D | D | D | C | B | A | A |
| 2.0 | D | D | D | C | C | A | A |
| 2.5 | C | D | D | C | B | A | A |
| 3.0 | B | C | C | C | B | A | A |
| 3.5 | A | B | B | B | A | A | A |
| 4.0 | A | A | A | A | A | A | A |
| 4.5 | A | A | A | A | A | A | A |
| 5.0 | A | A | A | A | A | A | A |

A: $|\Delta R| \geq 25\%$ is satisfied.
B: $|\Delta R| \geq 20\%$ is satisfied.
C: $|\Delta R| \geq 15\%$ is satisfied.
D: $|\Delta R| \geq 15\%$ is not satisfied.

In Table 3, since the optical interference layer simply was not provided, ΔR generally was small. On the other hand, in Table 4, although the optical inference layer was not provided, the refractive index of the recording layer was adjusted. Therefore, the same results of the case where the optical inference layer was provided (Table 1) were obtained. This is because the refractive index nc in the crystalline state of the recording layer was made small so that the ratio thereof (nc/na) to the refractive index na in the amorphous state was reduced from 0.95 (3.9/4.1) to 0.49 (2.0/4.1). When the ratio (nc/na) of the refractive indexes was 0.8 or less based on the calculation as above, it was confirmed that ΔR was increased to a preferable value for practical use of the reflectance increase-type medium, even if the optical interference layer is not provided.

In some cases depending on the material, the ratio (nc/na) of the refractive indexes may be varied significantly with a wavelength λ. More specifically, it is likely that the shorter the wavelength is, the smaller the ratio (nc/na) is. Therefore, it is preferable that the wavelength λ of the laser light is 500 nm or less, especially when the optical interference layer is not used.

Figure 5:
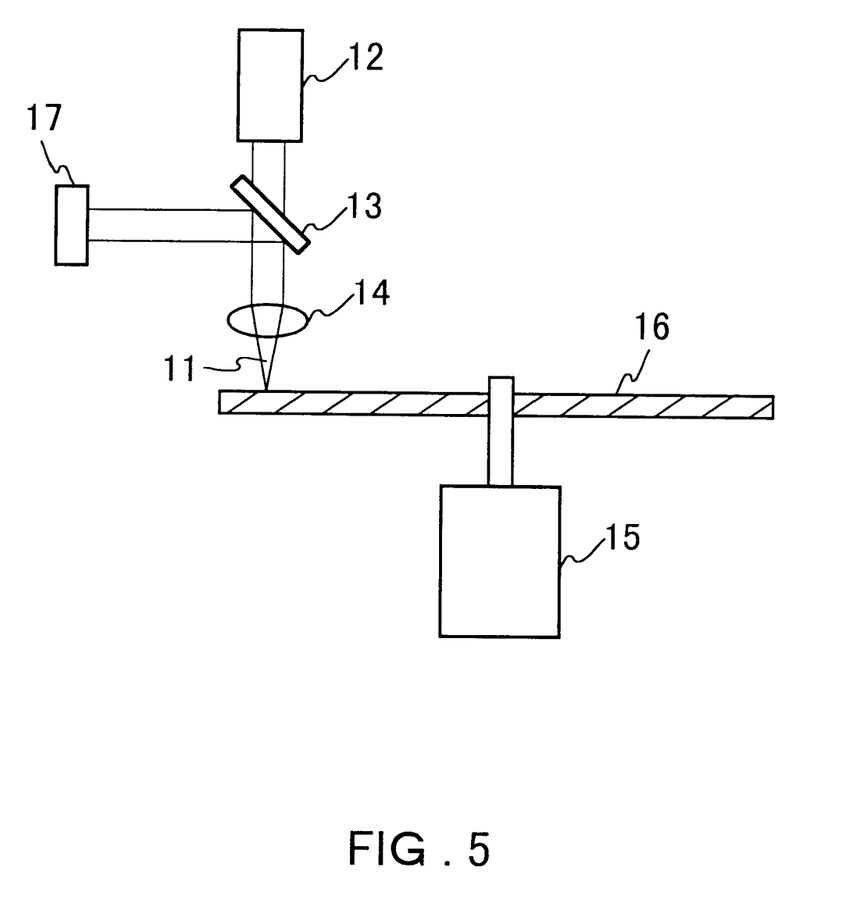
FIG. 5 is a schematic view showing the structure of an apparatus for recording/reproducing information on/from the optical information recording medium of the present invention.

FIG. 5 is a schematic view of an apparatus for performing recording and reproduction with the optical information recording medium of the present invention. In this apparatus, the laser light 11 emitted from a laser diode 12 passes through a half mirror 13 and an object lens 14 and is focused on an optical disk 16 that is being rotated by a motor 15, so that information signals are recorded/reproduced.

Figure 6:
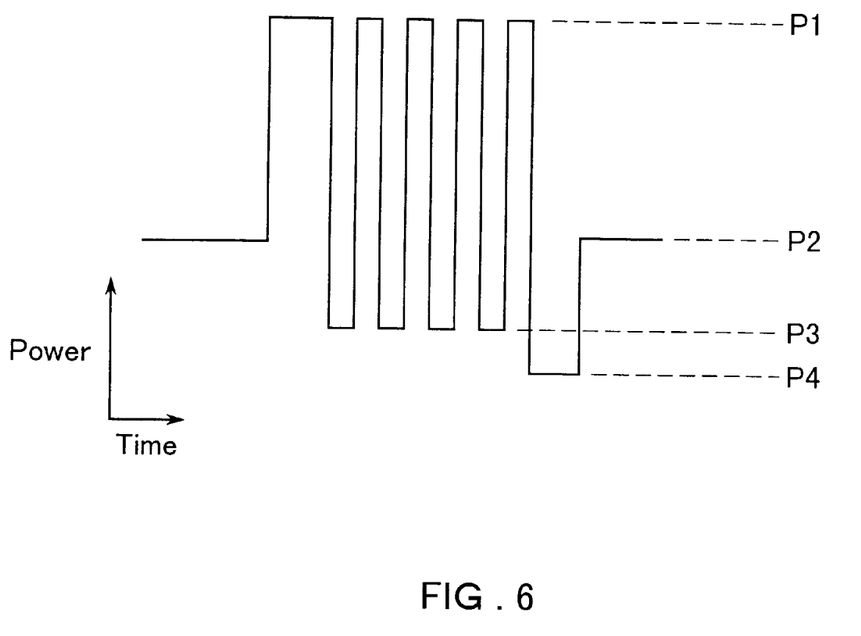
FIG. 6 is a diagram showing an example of a pulse waveform used for recording/reproducing information on/from the optical information recording medium of the present invention.

When information signals are recorded, the laser is modulated with a pulse waveform shown in FIG. 6. More specifically, the intensity of the laser light 11 is modulated at least between power level P1 and power levels P2 and P3 (P1>P2≧P3≧0). Herein, laser light of the power level P1 is sufficient to melt an irradiated portion instantly when the portion is irradiated with the light. Laser light of the power levels P2 and P3 cannot melt an irradiated portion instantly when the portion is irradiated with the light. The intensity of the laser light can be modulated preferably by modulating the driving current of a semiconductor laser. Alternatively, an electro-optical modulator, an acousto-optical modulator, etc. can be used.

The instant melting in the above description more specifically means melting within a period of time of irradiation of laser light that depends on the scanning rate of the laser light.

A single rectangular pulse of power level P1 may be sufficient for a portion where a mark is to be formed. However, especially when forming a long mark, it is preferable to use a recording pulse train having a plurality of pulses that is modulated among power levels P1, P2 and P3 for the purpose of saving excessive heat, forming uniform mark widths and reducing cross erase. The power level is kept constant at power level P2 for a portion where a mark is not to be formed or to be erased.

Furthermore, if a cooling section of power level P4 (P2>P4≧0) is provided immediately after the pulse train with a plurality of pulses, heat can be removed, especially in the rear end portion of a mark where heat readily becomes excessive. When this cooling section is provided, the effect of reducing cross erase can be improved. On the other hand, for the front end portion of the mark where the width hardly becomes amorphous and is readily narrowed, it is preferable to broaden the width of only the leading pulse of the plurality of pulses (FIG. 6) or to make the power level higher than P1 in order to match the width of the mark at the front end with that at the rear end.

On the other hand, when the length of each pulse of the plurality of pulses of the pulse train and the length between the pulses are constant, the modulation can be performed with a single frequency so that the modulation means can be simplified.

Furthermore, mark edge positions may be non-uniform for each pattern of the length of a recording mark, the length of a space before and after the recording mark, and the length of an adjacent mark, thus causing an increase of jitter. In the method for recording and reproducing information on the optical information recording medium of the present invention, it is preferable to adjust and compensate the pulse position or the pulse length of the pulse train, if necessary, so as to make the edge positions uniform for every pattern in order to prevent the increase of jitter and improve the jitter.

For reproducing information signals that are recorded in this manner, the optical disk 16 is irradiated with the laser light 11 of a power level that does not allow the information recorded in the first information layer 2 and the second information layer 4 to be erased. Then, the reflected light is incident to a photodetector 17 and a change in the reflected light quantity is detected as a reproduction signal.

EXAMPLES

Hereinafter, the present invention will be described more specifically by way of example, but the present invention is not limited thereto.

A substrate made of a polycarbonate resin, having a diameter of 12 cm, a thickness of 0.58 mm, a width of a groove and a width of a land of 0.6 μm, and a groove depth of about 70 nm was used as the transparent substrate. As a first information layer, a lower protective layer, a recording layer, and an upper protective layer were formed in this order on a surface of the transparent substrate provided with grooves by sputtering. The lower protective layer about 100 nm thick was formed with a ZnS—SiO$_2$ (the ratio by number of molecules ZnS:SiO$_2$=80:20) target. The recording layer about 7 nm thick was formed with a Ge—Sb—Te (the ratio by number of atoms Ge:Sb:Te=29:21:50) target. The upper protective layer about 110 nm thick was formed with a ZnS—SiO$_2$ (the ratio by number of molecules ZnS:SiO$_2$=80:20) target.

The same substrate as above was used as a protective substrate. As a second information layer, a reflective layer (high refractive index material layer), an upper protective layer, a recording layer, a lower protective layer and an optical interference layer were formed in this order on a surface of the protective substrate provided with grooves by sputtering. The reflective layer about 40 nm thick was formed with a Si target. The upper protective layer about 80 nm thick was formed with a ZnS—SiO$_2$ (the ratio by number of molecules ZnS:SiO$_2$=80:20) target. The recording layer about 10 nm thick was formed with a Ge—Sb—Te (the ratio by number of atoms Ge:Sb:Te=29:21:50) target. The lower protective layer about 70 nm thick was formed with a ZnS—SiO$_2$ (the ratio by number of molecules ZnS:SiO$_2$=80:20) target. The optical interference layer about 30 nm thick was formed with a Si target. In this example, the layers of the second information layer were laminated sequentially in the order from the side opposite to the laser light incident side, that is, the layer positioned farthest from the laser light incident side is formed first. For all the layers, a target having a diameter of about 10 cm and a thickness of about 6 mm was used, and Ar gas was used except for the recording layer, and a mixed gas of Ar and N$_2$ (the partial pressure of N$_2$ was about 5%) was used as the sputtering gas for film-formation.

Next, an ultraviolet curable resin was applied to the film surface of the second information layer. Then, the first information layer was attached to the second information layer so that the film surfaces thereof were opposed to each other. Then, the two information layers were pressed for tight attachment and irradiated with ultraviolet rays so that the ultraviolet curable resin was cured. Thus, a disk having two information layers was produced (disk A). Thereafter, the first information layer and the second information layer were annealed with laser light from the transparent substrate and the protective substrate, respectively, so that the entire surfaces were initialized, that is, crystallized.

As another example of the present invention, a disk B was produced in the same manner as for the disk A except that the following layers were formed in place of the optical interference layer made of Si: a second optical interference layer about 100 nm thick formed with a SiO$_2$ target; and a first optical interference layer about 70 nm thick formed with a ZnS—SiO$_2$ (the ratio by number of molecules ZnS:SiO$_2$=80:20) target. The second optical interference layer and the first optical interference layer were formed in this order from the side near the protective substrate.

Furthermore, as a comparative example, a disk C was produced in the same manner as for the disk A except that a reflective layer about 20 nm thick was formed with a Al—Cr target (the ratio by number of atoms Al:Cr=98:2) in place of the high refractive index material layer Si.

The optical constants (which were used for calculation in Table 1) at a wavelength of 660 nm obtained by actual measurement were n=1.6 and k=0.0 for all of the substrates and the resins; n=4.0 and k=0.2 for Si; n=2.1 and k=0.0 for ZnS—SiO$_2$; n=4.1 and k=1.6 for the amorphous state for Ge—Sb—Te; n=3.9 and k=4.2 for the crystalline state; n=1.5 and k=0.0 for SiO$_2$; and n=2.0 and k=6.0 for Al—Cr.

Mark edge recording was performed on these disks, using an optical system with a wavelength of 660 nm and NA of 0.6 at a linear velocity of 8.2 m/s (a radius position of about 40 mm and a revolution per minute of about 2000) and measurement was performed in the following manner. First, a 3T signal at 9.7 MHz and an 11T signal at 2.6 MHz alternately were recorded 11 times on a groove and a land. This track with the 3T signal recorded was reproduced, and the C/N ratio and the erasure ratio were measured by a spectrum analyzer. Herein, the erasure ratio refers to the ratio of the amplitude of the 3T signal and the amplitude of 11T signal. Next, cross erase was measured. First, a 3T signal at 9.7 MHz was recorded on a groove. This track was reproduced, and the amplitude A0 of the 3T signal was measured by a spectrum analyzer. Next, an 11T signal at 2.6 MHz was recorded multiple times (10,000 times in this example) repeatedly on lands on both sides of the groove. The groove was reproduced again and the amplitude A1 of the 3T signal was measured by a spectrum analyzer. The thus obtained damping ratio $\Delta A = A1 - A0$ of the amplitude of the 3T signal was used as the index for evaluation of cross erase. The same operations as above were performed except that the land and the groove were substituted with each other, and the damping ratio $\Delta A$ of the amplitude of the 3T signal was measured.

For the laser modulation wavelength for recording the signals, a single rectangular pulse with a pulse width of 51.3 ns (power level P1) was used in the case of the 3T signal. In the case of the 11T signal, a pulse train consisting of 9 pulses (power level P1) was used. In this case, the pulse width of the leading pulse was 51.3 ns, and the width of the second pulse and the subsequent pulses was 17.1 ns, and the width between the pulses (power level P3) also was 17.1 ns. Continuous light of power level P2 was used for the portion where a mark is not to be recorded. The power level was determined as follows. The power level P1 was 1.5 times the lower limit of the power that allows the C/N ratio of a recorded 3T signal to exceed 45 dB. The power levels P2 and P3 were the median in the power range that allows the erasure ratio to exceed 15 dB. The power level for reproduction was 2.0 mW for reproducing the first information layer, and 2.5 mW for reproducing the second information layer.

Table 5 shows the results of the measurement.

TABLE 5

|  |  |  | C/N ratio | Erasure ratio | p1 | ΔA |
|---|---|---|---|---|---|---|
| Disk A | First information layer | Groove | 51 dB | 23 dB | 11 mW | 1 dB |
|  |  | Land | 51 dB | 21 dB | 11 mW | 1 dB |
|  | Second information layer | Groove | 51 dB | 23 dB | 11 mW | 2 dB |
|  |  | Land | 51 dB | 22 dB | 11 mW | 1 dB |
| Disk B | First information layer | Groove | 51 dB | 23 dB | 11 mW | 1 dB |
|  |  | Land | 51 dB | 21 dB | 1 1mW | 1 dB |
|  | Second information layer | Groove | 51 dB | 22 dB | 10 mW | 1 dB |
|  |  | Land | 51 dB | 22 dB | 11 mW | 1 dB |
| Disk C | First information layer | Groove | 51 dB | 23 dB | 11 mW | 1 dB |
|  |  | Land | 51 dB | 21 dB | 11 mW | 1 dB |
|  | Second information layer | Groove | 52 dB | 23 dB | 13 mW | 4 dB |
|  |  | Land | 51 dB | 23 dB | 13 mW | 3 dB |

In any information layers of any disks, the C/N ratio was 50 dB or more, and the erasure ratio was 20 dB or more. Thus, these disks can provide sufficiently good signal quality in an application as a practical recording medium. However, in the second information layer of the disk C as the comparative example, the recording power level was about 13 mW, which is near the limit of semiconductor lasers for red color that are mass produced and are available at the present. Therefore, the disk C is not preferable as a practical recording medium. In addition, in the second information layer of the disk C, the damping ratio ΔA of the amplitude at repeated recording on the adjacent track was 3 to 4 dB, so that the disk C may be not sufficient as high density recording medium unless the specification of the disk, such as the widths of the groove and the land is optimized. On the other hand, for the first information layer and the second information layer of the disks A and B of this example, the recording power level P1 is about 11 mW or less, and the damping ratio ΔA of the amplitude at repeated recording on the adjacent track was about 1 dB or less, so that they can be a highly sensitive recording medium suitable for high density recording in every respect.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium comprising a first information layer, a separating layer, a second information layer and a protective substrate in this order on a transparent substrate, wherein the second information layer comprises an optical interference layer, a lower protective layer, a recording layer that changes between two different states detectable optically by irradiation of light beams, an upper protective layer, and a reflective layer whose refractive index is at least 2.5 at a wavelength $\lambda$ of light beams used for recording in this order from a side near the transparent substrate, the optical interference layer comprises a first optical interference layer and a second optical interference layer in this order from a side near the transparent substrate, a refractive index of the second optical interference layer at the wavelength $\lambda$ is smaller than that of the first optical interference layer and is smaller than that of the lower protective layer, an extinction coefficient of the first optical interference layer and an extinction coefficient of the second optical interference layer are both not more than 1, and a reflectance of the second information layer with respect to the light beams used for recording incident from the transparent substrate side after recording is higher than that before recording.

2. The optical information recording medium according to claim 1, wherein the first information layer comprises a recording layer that changes between two different states detectable optically by irradiation of light beams, and the first information layer has a transmittance of at least 30% with respect to the light beams used for recording.

3. The optical information recording medium according to claim 1, wherein the refractive index of the reflective layer at the wavelength $\lambda$ is not less than 3.0.

4. The optical information recording medium according to claim 1, wherein an extinction coefficient of the reflective layer at the wavelength $\lambda$ is not more than 4.0.

5. The optical information recording medium according to claim 1, wherein a heat conductivity of the reflective layer is not more than 50 W/(m·K).

6. The optical information recording medium according to claim 1, further comprising an interface layer at at least one interface selected from the group consisting of an interface between the lower protective layer and the recording layer and an interface between the recording layer and the upper protective layer.

7. The optical information recording medium according to claim 1, wherein the recording layer comprises Ge, Sb and Te.

8. The optical information recording medium according to claim 7, wherein $0.10 \leq x \leq 0.50$ and $0.40 \leq z \leq 0.60$ are satisfied, when a ratio by number of atoms of Ge, Sb and Te is expressed by x:y:z (x+y+z=1).

9. The optical information recording medium according to claim 1, wherein the reflective layer comprises at least one element selected from the group consisting of Ti, Zr, Hf, V, Nb, Ta, Cr, Mo, W, Mn, Zn, Cd, Si, Ge, Sn, Pb, Sb, Bi, and Te.

* * * * *